United States Patent
Jin et al.

(10) Patent No.: US 12,202,918 B2
(45) Date of Patent: Jan. 21, 2025

(54) PHOTOCURABLE (METH)ACRYLATE COMPOSITIONS

(71) Applicant: Henkel AG & Co. KGaA, Duesseldorf (DE)

(72) Inventors: Shuhua Jin, Cheshire, CT (US); Chih-Min Cheng, Westford, MA (US)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 17/654,639

(22) Filed: Mar. 14, 2022

(65) Prior Publication Data
US 2022/0204660 A1  Jun. 30, 2022

Related U.S. Application Data

(63) Continuation of application No. PCT/US2020/051652, filed on Sep. 18, 2020.

(60) Provisional application No. 62/902,611, filed on Sep. 19, 2019.

(51) Int. Cl.
| | |
|---|---|
| *C08F 2/50* | (2006.01) |
| *B01D 67/00* | (2006.01) |
| *B01D 69/12* | (2006.01) |
| *C08F 220/20* | (2006.01) |
| *C08F 220/56* | (2006.01) |
| *C08F 222/10* | (2006.01) |
| *C08G 18/12* | (2006.01) |

(52) U.S. Cl.
CPC ............ *C08F 2/50* (2013.01); *B01D 67/0088* (2013.01); *B01D 69/1214* (2022.08); *B01D 69/125* (2013.01); *C08F 220/20* (2013.01); *C08F 220/56* (2013.01); *C08F 222/102* (2020.02); *C08F 222/1065* (2020.02); *C08G 18/12* (2013.01)

(58) Field of Classification Search
None
See application file for complete search history.

(56) References Cited

U.S. PATENT DOCUMENTS

| | | | |
|---|---|---|---|
| 4,258,123 A | 3/1981 | Nagashima et al. | |
| 4,505,793 A | 3/1985 | Tamoto et al. | |
| 4,730,021 A * | 3/1988 | Zom ................... | C08F 299/065 525/278 |
| 5,234,970 A * | 8/1993 | Kyle ................... | C08G 18/672 522/174 |
| 5,395,862 A | 3/1995 | Neckers et al. | |
| 5,451,343 A | 9/1995 | Neckers et al. | |
| 5,545,676 A | 8/1996 | Palazzotto et al. | |
| 6,177,535 B1 * | 1/2001 | Schwalm .............. | C08G 18/672 522/90 |
| 6,335,381 B1 * | 1/2002 | Hovestadt .......... | C08G 18/8175 528/65 |
| 6,471,882 B1 * | 10/2002 | Namikawa .............. | B32B 38/10 156/922 |
| 6,500,876 B2 * | 12/2002 | Weikard ............. | C08G 18/8175 528/65 |
| 6,599,955 B1 * | 7/2003 | Weikard ............... | C09D 175/16 522/167 |
| 7,064,165 B2 * | 6/2006 | Baumgart ............ | C09D 175/16 528/45 |
| 7,419,564 B2 * | 9/2008 | Henke .................. | C08G 18/672 156/275.7 |
| 8,119,245 B2 * | 2/2012 | Kendi ................... | C09D 175/16 522/90 |
| 9,412,893 B2 * | 8/2016 | Ehbing ............... | H01L 31/0481 |
| 9,932,493 B2 * | 4/2018 | Ekin .................... | C08G 18/725 |
| 2004/0011429 A1 | 1/2004 | Bradford et al. | |
| 2004/0011723 A1 | 1/2004 | Bradford et al. | |
| 2006/0162860 A1 | 7/2006 | Henke et al. | |
| 2008/0159706 A1 | 7/2008 | Andre et al. | |
| 2009/0012202 A1 | 1/2009 | Jacobine et al. | |
| 2012/0276373 A1 | 11/2012 | Port et al. | |
| 2015/0166704 A1 | 6/2015 | Otani et al. | |
| 2018/0320021 A1 | 11/2018 | Potzmann | |

FOREIGN PATENT DOCUMENTS

| | | | |
|---|---|---|---|
| CN | 001896156 | 1/2007 | |
| CN | 105801807 | 7/2016 | |
| EP | 0369645 | 5/1990 | |
| EP | 0563925 | 10/1993 | |
| EP | 760250 A1 * | 3/1997 | ........... B01D 61/362 |
| EP | 2801401 A1 | 11/2014 | |
| JP | 63227638 A * | 9/1988 | ........... C08G 18/672 |
| JP | 63278502 A * | 11/1988 | ........... B01D 69/125 |
| JP | 08060043 | 3/1996 | |
| WO | 2013114297 | 8/2013 | |

OTHER PUBLICATIONS

PCT International Search Report issued in connection with International Application No. PCT/US2020/051652 mailed Dec. 30, 2020.

PCT International Search Report issued in connection with International Application No. PCT/US2020/051644 mailed Jan. 22, 2021.

* cited by examiner

*Primary Examiner* — Sanza L. McClendon
(74) *Attorney, Agent, or Firm* — Steven C. Bauman

(57) ABSTRACT

Photocurable (meth)acrylate compositions for forming features on the surfaces of membranes, and particularly, on membranes used in osmosis and reverse-osmosis applications, such as membrane filters.

24 Claims, No Drawings

PHOTOCURABLE (METH)ACRYLATE COMPOSITIONS

BACKGROUND

1. Field

The present invention relates to curable (meth)acrylate compositions comprising an isocyanate functional compound and methods of preparation and use of such compositions. More particularly, the present invention relates to photocurable (meth)acrylate compositions for forming features on the surfaces of membranes, and particularly with membranes used in osmosis and reverse-osmosis applications, such as membrane filters.

2. Brief Description Related Technology

Curable compositions have been used widely for sealing, adhesive, coating and potting applications, to name a few. The choice of the type backbones and curable groups is generally selected with reference to the specific end use application and the environment in which it is intended to be used. Polymers having various degrees of unsaturated groups, as well as other functionally crosslinking groups have been used.

For reverse osmosis (RO) membrane bonding and spacing, commonly used adhesives (i.e., curable compositions) are two-part room temperature curing polyurethane or epoxy. The two parts must be mixed and applied before gel time to form parts, which is not desirable for some applications. Light cure acrylates containing a (meth)acrylate-terminated polybutadiene have been disclosed for membrane fold protection, but bonding to membranes was not reported. Polybutanediene acrylate oligomers generally have low adhesion to many substrates. Light cure acrylate containing polyether urethane acrylate resins are known to have good hydrolytically stability, but bonding to RO membranes is challenging in alkaline solutions.

Adhesion promoters act at the interface between an organic adhesive material and an organic/inorganic substrate to enhance adhesion between the two materials. The two materials often differ in ways that makes forming a strong adhesive bond between them difficult, e.g., differences in compatibility, chemical reactivity, surface properties, and coefficient of thermal expansion. An adhesion promoter acts to chemically and physically bond these dissimilar materials into a strong cohesive bond structure. Adhesion promoters can impart resistance to environmental and other destructive forces, such as heat and moisture, which often act on the bonded site to destroy adhesive strength.

Adhesion promoters are frequently molecules with reactive functional groups on two ends of the molecule. Functional groups known to increase adhesion of polymers to surfaces include phosphate and carboxylic acids (metal adhesion) and silyl ethers (glass/siliceous adhesion), which hydrolyze to give reactive Si—OH bonds. Monomers having functional groups such as acids, amines, and hydroxyls can impart polymer adhesion to many substrates. Various adhesion promoters have been used to improve adhesion to substrates such as glass, plastics, and metals, but the use of adhesion promoters for adhesion to filtration membranes is not known. Dual curing compositions with isocyanate and acrylate terminal groups have been used in hot melt and conformal coatings, but have not been used to enhance adhesion to membranes.

Moreover, even if adequate adhesion between the curable composition and membrane surface is initially achieved, materials adhered to membrane surfaces, e.g., spacer features, are required to maintain good adhesion to the membrane after curing and during use and maintenance of the membrane. Use and maintenance of, for example, RO membranes require that the membrane surface and the features/spacers adhere thereto be exposed to an aqueous environment. In particular, cleaning of the membranes often requires exposure of the membrane to acid and basic aqueous solutions. The features formed by the cured composition may face degradation when in contact with water, particularly under acidic and alkaline solutions, causing loss of mass, mechanical strength, and adhesion to membrane during use and maintenance. There is a need for a photocurable (meth)acrylate composition and a process of using such composition to form features on the membrane surface, which allows for good adhesion of the cured composition to a membrane surface, as well as maintenance of good adhesion, mass, and mechanical strength of the cured composition during subsequent use and maintenance of the membrane.

SUMMARY

The present invention provides a photocurable composition including: a) a (meth)acrylate-functionalized urethane component; b) a (meth)acrylate monomer; and c) a photoinitiator, wherein the (meth)acrylate-functionalized urethane component comprises isocyanate functionality and/or the photocurable composition further includes: d) an isocyanate-functionalized adhesion promoter, and wherein when deposited on a polyamide surface of a substrate and exposed to UV or visible light the curable composition forms a cured reaction product on the polyamide surface of the substrate and the cured reaction product demonstrates an adhesion to the polyamide surface of the substrate characterized by: 1) substrate failure after immersion in acidic, aqueous (pH=1.5) conditions for about 1 week at a temperature of about 50° C.; and/or 2) substrate failure after immersion in basic, aqueous (pH=12.5) conditions for about 1 week at a temperature of about 50° C.; and/or 3) substrate failure after immersion in neutral, aqueous (pH=7.0) conditions for about 1 week at a temperature of about 50° C., wherein the substrate is a reverse osmosis membrane with a polyamide surface.

In another aspect of the present invention, there is provided a composite membrane structure including: a) a membrane including at least one surface; and b) the cured reaction product of the curable composition discussed above disposed on at least a portion of the at least one surface of the membrane.

In a further aspect of the present invention, there is provided a method of a producing a cured reaction product including the steps of: a) providing a curable composition including: i) a (meth)acrylate-functionalized urethane component; ii) a (meth)acrylate monomer; and iii) a photoinitiator; wherein the (meth)acrylate-functionalized urethane component comprises isocyanate functionality and/or the photocurable composition further includes: iv) an isocyanate-functionalized adhesion promoter, and b) exposing the curable composition to a source of UV or visible light to form a cured reaction product, wherein when deposited on a polyamide surface of a substrate and exposed to UV or visible light the curable composition forms a cured reaction product on the polyamide surface of the substrate and the cured reaction product demonstrates an adhesion to the polyamide surface of the substrate characterized by: 1) substrate failure after immersion in acidic, aqueous (pH=1.5) conditions for about 1 week at a temperature of about 50° C.; and/or 2) substrate failure after immersion in basic, aqueous (pH=12.5) conditions for about 1 week at a temperature of about 50° C.; and/or 3) substrate failure after immersion in neutral, aqueous (pH=7.0) conditions for about 1 week at a temperature of about 50° C., wherein the substrate is a reverse osmosis membrane with a polyamide surface.

DETAILED DESCRIPTION

The present invention is directed to photocurable (meth) acrylate compositions, which include: a) a (meth)acrylate-functionalized urethane component; b) a (meth)acrylate monomer; and c) a photoinitiator, wherein the (meth)acrylate-functionalized urethane component comprises isocyanate functionality and/or the photocurable composition further includes: d) an isocyanate-functionalized adhesion promoter, and wherein when deposited on a polyamide surface of a substrate and exposed to UV or visible light the curable composition forms a cured reaction product on the polyamide surface of the substrate and the cured reaction product demonstrates an adhesion to the polyamide surface of the substrate characterized by: 1) substrate failure after immersion in acidic, aqueous (pH=1.5) conditions for about 1 week at a temperature of about 50° C.; and/or 2) substrate failure after immersion in basic, aqueous (pH=12.5) conditions for about 1 week at a temperature of about 50° C.; and/or 3) substrate failure after immersion in neutral, aqueous (pH=7.0) conditions for about 1 week at a temperature of about 50° C., wherein the substrate is a reverse osmosis membrane with a polyamide surface.

In an aspect of the present invention, the curable composition has a viscosity of about 10,000 to about 100,000 or about 20,000 to about 80,000 centipoise (at 25° C., 10 s$^{-1}$).

In an aspect of the present invention, the curable composition has an optimized rheology that is effectively balanced to allow for sufficient thixotropy to allow for ease of deposition, and yet, maintain its physical structure after deposition and prior to cure. As used herein, "thixotropy" means that the substance becomes less viscous when stress (for example mixing or shaking) is applied and is more viscous when free of such stress (e.g., under static conditions).

In a further aspect of the present invention, the curable composition has a thixotropic index of about 1.5 to about 10 or form about 2 to about 8. As used herein, the "thixotropic index" means the ratio of the viscosity (in centipoise) of the curable composition at a speed of 1 s$^{-1}$ to the viscosity (in centipoise) of the curable composition at a speed of 10 s$^{-1}$ (viscosity at 1 s$^{-1}$/viscosity at 10 s$^{-1}$). The viscosity may be determined using known methods, for example, cone and plate rheometer, parallel plate rheometer, or rotation viscometer, such as Brookfield viscometer.

In an aspect of the present invention, the (meth)acrylate-functionalized polyether urethane component is a polyether urethane acrylate oligomer. In an aspect of the present invention, the (meth)acrylate-functionalized polyether urethane component may be synthesized by reacting diisocyanate with a polyether polyol to yield an isocyanate-terminated urethane. The isocyanate-terminated urethane is then reacted with a hydroxy-terminated acrylate to provide acrylate groups at the ends of the oligomer. If the terminal isocyanates are not completely reacted with the hydroxy acrylate, isocyanates will remain in the structure as reactive groups in addition to the acrylate terminal groups.

Suitable urethane acrylate oligomers include, but are not limited to, aliphatic urethane acrylates. Examples of suitable urethane acrylate oligomers include Ebecryl 230, 264, 265, 270, 1258, 1290, 4100, 4200, 4265, 4666, 4738, 4740, 4827, 4858, 4858, 4859, 5129, 8210, 8301, 8415, 8620, 8604, 8605, 8702, 8807, 8800-20R (all from Allnex), BR 582E8, BR-930D, BR-3042, BR 3471 (all from Dymax), Genomer 4297, 4302, 4312, 4316, 4425, 4622, 4230, 4217, 4267 (all from Rahn), Photomer 6891, 4184, 6008, 6230, 6645, 6692 (all from IGM), CN9002, 9004, 9178, 940, 989, 996, 9011, 980, 991 (all from Sartomer), and combinations thereof. In an aspect of the present invention, the urethane acrylate oligomer is Ebecryl 880-20R (Allnex), Ebecryl 8807 (Allnex), BR 582E8 (Dymax), or a combination thereof.

In a further aspect of the present invention, the (meth)acrylate-functionalized polyether urethane component is present in an amount of about 20% to about 60% by weight or about 30% to about 50% by weight based on the total weight of the curable composition.

In another aspect of the present invention, the (meth)acrylate-functionalized polyether urethane component further includes an isocyanate functionality. Suitable (meth)acrylate-functionalized polyether urethane components including isocyanate functionality include, but are not limited to, Ebecryl 4141, 4250, 4396, 4397, 4510 and 4765 (all from Allnex), and combinations thereof.

Suitable (meth)acrylate monomers include, but are not limited to, (meth)acrylic acid, methyl (meth)acrylate, ethyl (meth)acrylate, n-propyl (meth)acrylate, isopropyl (meth) acrylate, n-butyl (meth)acrylate, isobutyl (meth)acrylate, tert-butyl (meth)acrylate, n-pentyl(meth)acrylate, n-hexyl (meth)acrylate, cyclohexyl (meth)acrylate, n-heptyl (meth) acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, tolyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, γ-(methacryloyloxypropyl)trimethoxysilane, (meth)acrylic acid-ethylene oxide adduct, trifluoromethylmethyl (meth) acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth) acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth) acrylate, and 2-perfluorohexadecylethyl (meth)acrylate. In an aspect of the present invention, the (meth)acrylate monomer is polyethylene glycol diacrylate, such as SR 259 (polyethylene glycol (200) diacrylate from Sartomer). Suitable multifunctional (meth)acrylates include, but are not limited to, polyethylene glycol di (meth)acrylates, desirably triethyleneglycol di(meth)acrylate, hydroxypropyl(meth) acrylate, bisphenol-A di(meth)acrylates, such as ethoxylated bisphenol-A (meth)acrylate ("EBIPA" or "EBIPMA"), and tetrahydrofuranmeth)acrylates and di(meth)acrylates, citronellyl acrylate and citronellyl methacrylate, hexanediol di(meth)acrylate ("HDDA" or "HDDMA"), trimethylol propane tri(meth)acrylate, tetrahydrodicyclopentadienyl(meth) acrylate, ethoxylated trimethylol propane triacrylate ("ETTA"), triethylene glycol diacrylate and triethylene glycol dimethacrylate ("TRIEGMA").

In an aspect of the present invention, the (meth)acrylate monomer is present in an amount of about 10% to about 50% by weight or about 20% to about 40% by weight based on the total weight of the curable composition.

In a further aspect of the present invention, the (meth) acrylate monomer has a viscosity of less than about 1,000 cps or less than about 500 cps.

In aspect of the present invention, the isocyanate-functionalized adhesion promoter is a isocyanate-terminated urethane acrylate, an isocyanate-terminated aliphatic prepolymer, or a combination thereof. Suitable isocyanate-terminated urethane acrylates include, but are not limited to, Ebecryl 4141, 4250, 4396, 4397, 4510 and 4765 (all from Allnex), and combinations thereof. Suitable isocyanate-terminated aliphatic prepolymers include, but are not limited to, Desmodur XP 2599 (Covestro), Desmodur VPLS 2371 (Covestro), or a combination thereof.

In an aspect of the present invention, the isocyanate-functionalized adhesion promoter is present in an amount of about 5% to about 60% by weight or about 10% to about 30% based on the total weight of the curable composition.

In aspects of the present invention the curable composition is a photocurable or light curable composition, i.e., curable using light such as visible or ultraviolet light (UV). In aspects of the present invention, the curable composition may be cured using a light source, such a bulb or LED that produces visible or UV light.

In an additional aspect of the present invention, the photoinitiator, may be a UV initiator, a visible initiator, or a combination of UV and visible initiators. In one aspect of the present invention, the photoinitiator is a polymeric structure to which is attached at least one chromophore that is excited by radiation in the UV light or visible light range.

A variety of UV initiators may be employed. UV initiators are generally effective in the 200 to 400 nm range, and particularly in the portion of the spectrum that borders on the invisible light and the visible portion just beyond this, e.g. >200 nm to about 390 nm.

Initiators that will respond to UV radiation to initiate and induce curing of the (meth)acryl functionalized curable component, which are useful in the present invention include, but are not limited to, benzophenone and substituted benzophenones, acetophenone and substituted acetophenones, benzoin and its alkyl esters, xanthone and substituted xanthones, phosphine oxides, diethoxy-acetophenone, benzoin methyl ether, benzoin ethyl ether, benzoin isopropyl ether, diethoxyxanthone, chloro-thio-xanthone, N-methyl diethanol-amine-benzophenone, 2-hydroxy-2-methyl-1-phenyl-propan-1-one, 2-benzyl-2-(dimethylamino)-1-[4-(4-morpholinyl)phenyl]-1-butanone and mixtures thereof.

Examples of such UV initiators include initiators available commercially from IGM Resins under the "OMNIRAD" (formerly "IRGACURE") and "DAROCUR" tradenames, specifically "OMNIRAD" 184 (1-hydroxycyclohexyl phenyl ketone), 907 (2-methyl-1-[4-(methylthio)phenyl]-2-morpholino propan-1-one), 369 (2-benzyl-2-N,N-dimethylamino-1-(4-morpholinophenyl)-1-butanone), 500 (the combination of 1-hydroxy cyclohexyl phenyl ketone and benzophenone), 651 (2,2-dimethoxy-2-phenyl acetophenone), 1700 (the combination of bis(2,6-dimethoxybenzoyl-2,4,4-trimethyl pentyl)phosphine oxide and 2-hydroxy-2-methyl-1-phenyl-propan-1-one), and 819 [bis(2,4,6-trimethyl benzoyl)phenyl phosphine oxide], and "DAROCUR" 1173 (2-hydroxy-2-methyl-1-phenyl-1-propane) and 4265 (the combination of 2,4,6-trimethylbenzoyldiphenyl-phosphine oxide and 2-hydroxy-2-methyl-1-phenyl-propan-1-one); and 2,4,6-trimethylbenzoyldiphenylphosphine oxide (commercially available as LUCIRIN TPO from BASF Corp.). Of course, combinations of these materials may also be employed herein. Of course, it is understood that some of these photoinitiators categorized herein as UV photoinitiators have a tailing absorption into the visible range, and thus straddle the line between UV and visible light cure initiators, but nonetheless are included herein as part of the invention.

Initiators suitable for use in the present invention that will respond to visible light to initiate and induce curing include camphorquinone peroxyester initiators, 9-fluorene carboxylic acid peroxyesters, visible light [blue] photoinitiators, d1-camphorquinone, "IRGACURE" 784DC (photoinitiator based on substituted titanocenes), and combinations thereof.

Other suitable photoinitiator systems include those disclosed in each of the following patents or publications, each of which is incorporated by reference herein in its entirety. U.S. Pat. No. 4,505,793 to Tamoto et al., which is incorporated by reference herein, discloses photopolymerization initiators that include a combination of a 3-keto-substituted cumarin compound and an active halogen compound. A number of exemplary compounds are disclosed. Such photopolymerization initiators cure by exposure to light having wavelengths ranging between about 180 nm and 600 nm. U.S. Pat. No. 4,258,123 to Nagashima et al., which is incorporated by reference herein, discloses photosensitive resin compositions including initiator components that generate a free radical upon irradiation with actinic light. Such components include various triazine compounds, as more fully described therein.

Additional useful components are disclosed in the following document, which is incorporated herein by reference. European Patent Publication No. EP 0 369 645 A1 discloses a three-part photoinitiator system which includes a trihalomethyl substituted-s-triazine, a sensitizing compound capable of absorbing radiation in the range of about 300-1000 nm and an electron donor. Exemplary sensitizing compounds are disclosed, including: ketones; coumarin dyes; xanthene dyes; 3H-xanthen-3-one dyes; acridine dyes; thiazole dyes; thiazine dyes; oxazine dyes; azine dyes; aminoketone dyes; methane and polymethine dyes; porphyrins; aromatic polycyclic hydrocarbons; p-substituted aminostyryl ketone compounds; aminotriaryl methanes; merocyanines; squarylium dyes; and pyridinium dyes. Exemplary donors also are disclosed, including: amines; amides; ethers; ureas; ferrocene; sulfinic acids and their salts; salts of ferrocyanide; ascorbic acid and its salts; dithiocarbamic acid and its salts; salts of xanthates; salts of ethylene diamine tetraacetic acid; and salts of tetraphenylboronic acid. Such initiators are sensitive to both UV and visible light.

Additional useful components are disclosed in the following document, which is incorporated herein by reference. European Patent Publication No. EP 0 563 925 A1 discloses photopolymerization initiators including a sensitizing compound that is capable of absorbing radiation in the range of about 250-1000 nm and 2-aryl-4,6-bis(trichloromethyl)-1,3,5-triazine. Exemplary sensitizing compounds that are disclosed include: cyanine dye, merocyanine dye, coumarin dye, ketocoumarin dye, (thio)xanthene dye, acridine dye, thiazole dye, thiazine dye, oxazine dye, azine dye, aminoketone dye, squarylium dye, pyridinium dye, (thia)pyrylium dye, porphyrin dye, triaryl methane dye, (poly)methane dye, amino styryl compounds and aromatic polycyclic hydrocarbons. These photopolymerization initiators are sensitive to UV and visible light.

U.S. Pat. No. 5,395,862 to Neckers et al., which is incorporated by reference herein, discloses fluorone photoinitiators, which are sensitive to visible light. Such fluorone initiator systems also include a coinitiator, which is capable of accepting an electron from the excited fluorone species. Exemplary coinitiators are disclosed, including: onium salts, nitrohalomethanes and diazosulfones. U.S. Pat. No. 5,451,343 to Neckers et al., which is incorporated herein by reference, discloses fluorone and pyronin-Y derivatives as initiators that absorb light at wavelengths of greater than 350 nm. U.S. Pat. No. 5,545,676 to Palazzotto et al., which is incorporated by reference herein, discloses a three-part photoinitiator system, which cures under UV or visible light. The three-part system includes an arylidonium salt, a sensitizing compound and an electron donor. Exemplary iodonium salts include diphenyliodonium salts. Exemplary sensitizers and electron donors for use in the three-part system also are disclosed. Additionally, the sensitizer is capable of absorbing light in the range of about 300 to about 1000 nm.

In a further aspect of the present invention, the photoinitiator is present in an amount of about 0.2% to about 5% by weight or about 1% to about 3% by weight based on the total weight of the curable composition.

In an additional aspect of the present invention, the curable composition may further include a filler. Suitable fillers include organic and inorganic ones. Inorganics include silica, silicate, alumina, asbestos, barium sulphate, calcium carbonate, calcium fluoride, carbon black, clays, diatomaceous earth, feldspar, ferromagnetics, fly ash, glass fibers, gypsum, jute fiber, kaolin, lingnocellulosics, magnesium hydroxide, mica, microcrystalline cellulose, powdered metals, quartz, startch, talc, titanium dioxide, wood flour, wood fibers, and combinations thereof. Organic fillers include thermoplastic poymers such as polyvinylacetate, polyolefine, nylon fibers.

In an aspect of the present invention, the filler is present in amounts of about 2% to about 40% or about 5% to about 30% by weight based on the total weight of the curable composition.

Optional additives, such as, but not limited to, coinitiators, stabilizers, rheology modifiers, defoamers, inhibitors, oxygen scavenging agents, dyes, colors, pigments, adhesion promoters, plasticizers, toughening agents, reinforcing agents, fluorescing agents, wetting agents, antioxidants, and combinations thereof also may be included in the compositions of the present invention.

A composite membrane structure according to the present invention includes: a) a membrane including at least one surface; and b) the cured reaction product of the curable composition discussed above disposed on at least a portion of the at least one surface of the membrane.

A method of a producing a cured reaction product according to the present invention includes the steps of: a) providing a curable composition including: i) a (meth)acrylate-functionalized urethane component; ii) a (meth)acrylate monomer; and iii) a photoinitiator; wherein the (meth)acrylate-functionalized urethane component comprises isocyanate functionality and/or the photocurable composition further includes: iv) an isocyanate-functionalized adhesion promoter, and b) exposing the curable composition to a source of UV or visible light to form a cured reaction product, wherein when deposited on a polyamide surface of a substrate and exposed to UV or visible light the curable composition forms a cured reaction product on the polyamide surface of the substrate and the cured reaction product demonstrates an adhesion to the polyamide surface of the substrate characterized by: 1) substrate failure after immersion in acidic, aqueous (pH=1.5) conditions for about 1 week at a temperature of about 50° C.; and/or 2) substrate failure after immersion in basic, aqueous (pH=12.5) conditions for about 1 week at a temperature of about 50° C.; and/or 3) substrate failure after immersion in neutral, aqueous (pH=7.0) conditions for about 1 week at a temperature of about 50° C., wherein the substrate is a reverse osmosis membrane with a polyamide surface.

In an aspect of the present invention, the cured reaction product has a Shore D hardness of about 30 or greater, preferably about 30 to about 80 or about 35 to about 70.

In another aspect of the composite membrane structure of the present invention, the cured reaction product is adhesively bonded to at least a portion of the at least one surface of the membrane.

In another aspect of the composite membrane structure of the present invention, the cured reaction product is disposed on at least a portion of the at least one surface of the membrane in a pre-determined pattern. In embodiments of the composite membrane structure of the present invention, the pre-determined pattern is selected from the group consisting of stripes, waves, circles, ovals, arcs, squares, rectangles, diamonds, pentagons, hexagons, stars, chevrons, a random pattern, and combinations thereof.

In an aspect of the present invention, the pattern is formed on membrane surface by known methods, such as printing or deposition of the curable composition on the membrane surface followed by curing of the curable composition. The pattern formed on the membrane surface by the methods of the present invention are typically composed a numerous features formed from the cured reaction product. Generally, these features have physical characteristics that make them suitable for providing spacing between overlaid layers of the membrane. For example, the features may provide adequate spacing between layers of a spiral reverse osmosis filtering membrane to optimize the operation, cleaning, and lifespan of reverse osmosis membrane elements employing membranes with these features. In an aspect of the present invention, the pattern of features may have a size and shape sufficient to maintain adequate membrane spacing and to expose sufficient membrane surface to ensure efficient operation of the membrane.

Generally, the strength of the adhesion of an adhesive (e.g., a cure composition) to a substrate may be delineated by determining whether the adhesive or the substrate fails when an increasing force is applied to the adhesive to separate it from the substrate. If the adhesive maintains its integrity and the substrate is mechanically disrupted, then this would be considered a substrate failure (SF). In the event that the substrate remains intact and the adhesive is mechanically disrupted, then this would be considered an adhesive failure (AF).

As used herein "substrate failure" means when a curable composition of the present invention is cured on a polyamide surface of a reverse osmosis membrane as the substrate and tested for adhesion to substrate (or membrane) as described below the substrate fails, as opposed to the adhesive, when the force is applied. In another aspect of the present invention, the substrate employed to determine adhesion to the membrane (i.e., whether substrate failure occurs) is a reverse osmosis membrane with a polyamide surface, such as FILMTEC™ Flat Sheet BW30LE.

With regard to the curable compositions of the present invention, the adhesion to a substrate (or membrane) includes 1) curing the curable composition to form beads of the cured product adhered a membrane surface and forcibly removing these beads from the membrane surface. If the membrane tears it is considered a substrate failure (SF). If the membrane stays intact it is considered an adhesive failure (AF). A detailed description of examples of this testing method is provided in the Examples.

The surface upon which the curable composition is deposited may include the surface of any membrane suitable for application of the curable composition. In an aspect of the present invention, the surface upon which the curable composition is deposited is a membrane surface. As used herein, a "membrane" means a selective barrier that allows passage of some substances but prevents passage of other substances. In an aspect of the present invention, the membrane is a filter membrane, i.e., a membrane for filtering substances out of a liquid carrier, such as water. Filter membranes include reverse osmosis membranes, forward osmosis membranes, microfiltration membranes, ultrafiltration membranes, and nanofiltration membranes. Features composed of the cured composition may be deposited on the active surface of the membrane, or on the non-active surface of the membrane, or both.

Moreover, hydrophilic materials, such as glycerol, may be added to membranes to maintain membrane pore openings. In addition, antifouling agents, such as polyethylene glycol, may be employed in membranes.

The isocyanate functional groups of the photocurable (meth)acrylate composition of the preset invention will bond with the polyamide and/or the reactive hydroxyl-functionalized moieties on the membrane to form urethane chemical bonds. These bonds are stronger than the mechanical locking or hydrogen bonding formation of compositions lacking isocyanate functional groups.

In an aspect of the present invention, the membrane surface is constructed from polyamide and/or includes reactive hydroxyl-functionalized moieties.

In aspects of the present invention, the composite membrane structure according to the present invention demonstrates substrate failure after immersion for an extended period of time in aqueous conditions at an elevated temperature. As used herein, an "extended period of time" means about 0.5 week, about 1 week, about 2 weeks, about 3 weeks, about 4 weeks, about 5 weeks, or about 6 weeks. As used herein, an "elevated temperature" means about 30° C. or greater, about 35° C. or greater, about 40° C. or greater, about 45° C. or greater, about 50° C. or greater, about 55° C. or greater, about 60° C. or greater, or about 70° C. or greater.

In aspects of the present invention aqueous conditions may include acidic, aqueous conditions, basic, aqueous conditions, and neutral, aqueous conditions. As used herein, "acidic, aqueous conditions" means aqueous conditions with a pH of about 3 or less, about 2.5 or less, about 2 or less, about 1.5 or less, or about 1 or less. As used herein, "basic, aqueous conditions" means aqueous conditions with a pH of about 11 or greater, about 11.5 or greater, about 12 or greater, about 12.5 or greater, or about 13 or greater. As used herein, "neutral, aqueous conditions" means aqueous conditions with a pH between about 6 and about 8 or with a pH of about 7.

EXAMPLES

Materials

The following ingredients were employed in the examples described below:

TABLE 1

| Ingredient Name | Class | Supplier |
|---|---|---|
| Ebecryl 8800-20R | Aliphatic urethane acrylate | Allnex |
| Ebecryl 8807 | Polyether urethane acrylate | Allnex |
| BR582E8 | Polyether urethane acrylate | Dymax |
| CN 301 | Polybutandiene dimethacrylate | Sartomer |
| RC300 | Polybutyl acrylate | Kaneka |
| Ebecryl 4250 | Urethane acrylate resin containing isocyanate | Allnex |
| Ebecryl 4396 | Urethane acrylate resin containing isocyanate | Allnex |
| SR 259 | Acrylate monomer | Sartomer |
| Desmodur XP 2599 | Isocyanate prepolymer | Covestro |
| Desmodur VPLS 2371 | Isocyanate prepolymer | Covestro |
| Dynasylane DAMO T | Amino silane | Evonik |
| Photomer 4967 | Amine acrylate | IGM |
| KBM 5103 | Acrylate-terminated silane | Shin Etsu |
| Kayamer PM 2 | Phosphoric acid acrylate | Nippon Kayaku |
| NNDMA | N,N-dimethylacrylamide | Jarmon |
| HPA | Hydroxypropyl acrylate | BASF |
| R202 | Silane modified fumed silica (filler) | Evonik |
| Ceraflour 970 | Micronized polypropylene powder (filler) | BYK |
| Omnirad 819 | UV/Visible photoinitiator | IGM |
| Omnirad TPO-L | UV/Visible photoinitiator | IGM |

Testing Methods

The following testing methods were employed in the examples described below.

Viscosity and Thixotropic Index

Viscosities were measured at shear rate 1 s$^{-1}$ and 10 s$^{-1}$ using cone and plate rheometer (Anton Paar). Thixotropic index was calculated as the ratio of viscosities at 1 s$^{-1}$ and 10 s$^{-1}$.

Adhesion to Membrane

The curable composition was applied to a RO membrane (FILMTEC™ Flat Sheet BW30LE) to form a bead having a diameter of about 20 mil and a height of about 20 mil. The beads on the membrane were immediately cured for 10 seconds using a 405 nm LED light with an intensity of 1.5 W/cm$^2$.

The membrane with the deposited and beads of the cured reaction product was immersed in an aqueous solution with different pH for various times at a temperature of 50° C. A 1.5 pH solution was prepared by mixing 25 grams of 37% hydrochloric acid solution with 975 grams of distilled water. A 8 pH solution was prepared by adding 0.084 grams sodium bicarbonate, 0.111 grams calcium chloride, and 0.045 grams of 5% sodium hypochlorite into 1000 grams of distilled water. A 12.5 pH solution was prepared by adding 2 grams of sodium hydroxide into 1000 grams of distilled water.

The adhesion of the cured reaction product to the membrane was examined before and after immersion by manually removing the beads from the membrane using a spatula. If the membrane tears it is considered a substrate failure (SF). If the membrane stays intact it is considered an adhesive failure (AF).

Shore D Hardness

Shore D hardness was measured per ASTM D2240. The tested material was placed between two PE films and covered with two glass plates to form 1 mm thick sheet, and then was cured using LED light with an intensity of 1.5 W/cm$^2$ on both sides of the glass plate. The cured sheet was then cut into 4 pieces and then stacked to be measured by Shore durometer.

Comparative Example 1—Curable Compositions without Isocyanate-Functionalized Adhesion Promoter Various photocurable formulations without the addition of isocynate resins or isocyante-functionalized adhesion promoters were formulated as shown below in Table 2.

TABLE 2

| | Comparative Composition/Amt (wt %) | | | | |
|---|---|---|---|---|---|
| Ingredient | 1.1 | 1.2 | 1.3 | 1.4 | 1.5 |
| Ebecryl 8800-20R | 46 | | | | |
| Ebecryl 8807 | | 46 | | | |
| BR582E8 | | | 46 | | |
| CN 301 | | | | 46 | |
| RC300 | | | | | 46 |
| SR 259 | 30 | 30 | 30 | 30 | 30 |
| Omnirad 819 | 1 | 1 | 1 | 1 | 1 |
| R202 | 3 | 3 | 3 | 3 | 3 |
| Ceraflour 970 | 20 | 20 | 20 | 20 | 20 |
| Total | 100 | 100 | 100 | 100 | 100 |

These formulations were cured and tested for shore hardness and adhesion to membrane. The results are shown below in Table 3.

TABLE 3

| | Comparative Composition | | | | |
|---|---|---|---|---|---|
| Test | 1.1 | 1.2 | 1.3 | 1.4 | 1.6 |
| Shore D Hardness | 72 | 70 | 60 | 60 | 40 |
| Adhesion to membrane Prior to Immersion | SF | SF | SF | SF | AF |
| Adhesion to membrane 1 week in pH 1.5 Solution | SF | SF | SF | SF | AF |
| Adhesion to membrane 1 week in pH 8 Solution | SF | SF | SF | SF | AF |
| Adhesion to membrane 1 week in pH 12.5 Solution | AF | AF | AF | AF | AF |

The adhesion to the membrane for all the formulas showed substrate failure (SF) before immersion in the aqueous solutions. After immersion for 1 week, Comparative Compositions 1.1-1.4 maintained SF adhesion in the pH 1.5 and pH 8 solutions. Comparative Composition 1.5 lost adhesion and showed AF in all 3 solutions. All compositions lost adhesion and showed AF after immersion in the pH 12.5 solution.

Comparative Example 2—Curable Compositions with Conventional Adhesion Promoters

Various photocurable formulations with commonly used adhesion promoters were formulated as shown below in Table 4. The urethane acrylate oligomer Ebecryl 8807 used in Comparative Composition 1.2 was used in all compositions in this example. The commonly used adhesion promoters were: Photomer 4967, Dynasylane DAMO T, KBM 5103, Kayamer PM 2, NNDMA, and HPA. Comparative Composition 1.2 (without an adhesion promoter) was included for purposes of comparison.

TABLE 4

| | Comparative Composition/Amt (wt %) | | | | | | |
|---|---|---|---|---|---|---|---|
| Ingredient | 1.2 | 2.1 | 2.2 | 2.3 | 2.4 | 2.5 | 2.6 |
| Ebecryl 8807 | 46 | 43.2 | 45.6 | 45.6 | 43.2 | 43.2 | 43.2 |
| Photomer 4967 | | 10 | | | | | |
| Dynasylane DAMO T | | | 5 | | | | |
| KBM 5103 | | | | 5 | | | |
| Kayamer PM 2 | | | | | 10 | | |
| NNDMA | | | | | | 10 | |
| HPA | | | | | | | 10 |
| SR 259 | 30 | 27 | 28.5 | 28.5 | 27 | 27 | 27 |
| Omnirad 819 | 1 | 0.9 | 0.95 | 0.95 | 0.9 | 0.9 | 0.9 |
| R202 | 3 | 2.7 | 2.8 | 2.8 | 2.7 | 2.7 | 2.7 |
| Ceraflour 970 | 20 | 18 | 19 | 19 | 18 | 18 | 18 |
| Total | 100 | 100 | 100 | 100 | 100 | 100 | 100 |

These formulations were cured and tested for shore hardness and adhesion to membrane. The results are shown below in Table 5.

TABLE 5

| | Comparative Composition | | | | | | |
|---|---|---|---|---|---|---|---|
| Test | 1.2 | 2.1 | 2.2 | 2.3 | 2.4 | 2.5 | 2.6 |
| Shore D Hardness | 70 | 59 | 69 | 68 | 52 | 70 | 70 |
| Adhesion to membrane Prior to Immersion | SF | SF | SF | SF | SF | SF | SF |
| Adhesion to membrane 1 week in pH 1.5 Solution | SF | AF | SF | SF | SF | SF | SF |
| Adhesion to membrane 1 week in pH 8 Solution | SF | AF | SF | SF | SF | AF | SF |
| Adhesion to membrane 1 week in pH 12.5 Solution | AF | AF | AF | AF | AF | AF | AF |

The adhesion to the membrane for all the formulas showed substrate failure (SF) before immersion in the aqueous solutions. All compositions lost adhesion and showed AF after immersion in the pH 12.5 solution for 1 week. Comparative Compositions 2.2, 2.3, and 2.4 maintained SF after immersion in the pH 1.5 and pH 8 solutions. However, Comparative Composition 2.5 lost adhesion and showed AF after immersion in the pH 8 and pH 12.5 solutions. Comparative Composition 2.1 lost adhesion and showed AF after immersion in all solutions. In sum, as compared to Comparative Composition 1.2 (which is free of any adhesion promoter), the addition of these commonly used adhesion promoters did not improve or had adverse effect on adhesion to the membrane.

Inventive Example 1—Curable Compositions with Isocyanate-Terminated Urethane Acrylate (Isocyanate-Functionalized Adhesion Promoter)

Various photocurable formulations with the addition of an isocyanate-terminated urethane acrylate (i.e., an isocyanate-functionalized adhesion promoter) with an acrylate functionality of 1 and an isocyanate functionality of 2.2 (i.e., Ebecryl 4396) were formulated as shown below in Table 6.

TABLE 6

| | Inventive Composition/Amt (wt %) | | | | |
|---|---|---|---|---|---|
| Ingredient | 1.1 | 1.2 | 1.3 | 1.4 | 1.5 |
| Ebecryl 8800-20R | 39.1 | | | | |
| Ebecryl 8807 | | 39.1 | | | |
| BR582 E8 | | | 39.1 | | |
| CN 301 | | | | 39.1 | |
| RC300 | | | | | 39.1 |
| Ebecryl 4396 | 15 | 15 | 15 | 15 | 15 |
| SR 259 | 25.5 | 25.5 | 25.5 | 25.5 | 25.5 |
| Omnirad 819 | 0.85 | 0.85 | 0.85 | 0.85 | 0.85 |
| R202 | 2.55 | 2.55 | 2.55 | 2.55 | 2.55 |
| Ceraflour 970 | 17 | 17 | 17 | 17 | 17 |
| Total | 100 | 100 | 100 | 100 | 100 |

These formulations were cured and tested for shore hardness and adhesion to membrane. The results are shown below in Table 7. Also reported in Table 7 is the isocyanate NCO wt % in each formula calculated based on the amount of Ebecryl 4396 in each formula and the NCO % in Ebecryl 4396.

TABLE 7

| | Inventive Composition | | | | |
|---|---|---|---|---|---|
| Test | 1.1 | 1.2 | 1.3 | 1.4 | 1.5 |
| Isocyanate NCO (wt %) | 1.125 | 1.125 | 1.125 | 1.125 | 1.125 |
| Shore D Hardness | 66 | 62 | 50 | 52 | 32 |
| Adhesion to membrane Prior to Immersion | SF | SF | SF | SF | SF |
| Adhesion to membrane 1 week in pH 1.5 Solution | SF | SF | SF | SF | SF |
| Adhesion to membrane 1 week in pH 8 Solution | SF | SF | SF | SF | SF |
| Adhesion to membrane 1 week in pH 12.5 Solution | SF | SF | SF | AF | AF |

The adhesion to the membrane for all the formulas showed substrate failure (SF) before immersion in the aqueous solutions. The polyether urethane-containing formulations (Inventive Compositions 1.1, 1.2, and 1.3) all maintained membrane adhesion (SF) in all 3 solutions. Thus, the addition of the Ebecryl 4396 improved the membrane adhesion after immersion in the pH 12.5 solution as compared to analogous Comparative Compositions 1.1, 1.2, and 1.4, respectively. However, Shore D hardness decreased with the addition of the Ebecryl 4396.

Inventive Composition 1.5 (containing polybutyl acrylate oligomer) had substrate failure (SF) after immersion in both pH 1.5 and pH 8. This is an improvement over the AF membrane adhesion of analogous Comparative Composition 1.6 (without Ebecryl 4396). Inventive Compositions 1.4 (containing polybutandiene dimethacyrlate oligomer) had very similar adhesion failure mode compared to analogous Comparative Composition 1.5 (without Ebecryl 4396).

Inventive Example 2—Curable Compositions with Differing Amounts of Isocyanate-Terminated Urethane Acrylate (Isocyanate-Functionalized Adhesion Promoter)

Various photocurable formulations with the polyether urethane acrylate BR582 and the addition of differing amounts of the isocyanate-terminated urethane acrylate Ebecryl 4396 (i.e., an isocyanate-functionalized adhesion promoter) were formulated as shown below in Table 8. The amount of Ebecryl 4396 ranges from 0-30 wt %, wherein the composition with 0% Ebecryl 4396 is Comparative Composition 1.4.

TABLE 8

| | Composition/Amt (wt %) | | | | | |
|---|---|---|---|---|---|---|
| | Comparative | Inventive | | | | |
| Ingredient | 1.4 | 2.1 | 2.2 | 2.3 | 2.4 | 2.5 |
| BR582 E8 | 46 | 43.7 | 41.4 | 39.1 | 36.8 | 25.5 |
| Ebecryl 4396 | 0 | 5 | 10 | 15 | 20 | 30 |
| SR 259 | 30 | 28.5 | 27 | 25.5 | 24 | 21 |
| Omnirad 819 | 1 | 0.95 | 0.9 | 0.85 | 0.8 | 0.7 |
| R202 | 3 | 2.85 | 2.7 | 2.55 | 2.4 | 2.1 |
| Ceraflour 970 | 20 | 19 | 18 | 17 | 16 | 14 |
| Total | 100 | 100 | 100 | 100 | 100 | 100 |

These formulations were cured and tested for shore hardness and adhesion to membrane. The results are shown below in Table 9. Also reported in Table 9 is the isocyanate NCO wt % in each formula calculated based on the amount of Ebecryl 4396 in each formula and the NCO % in Ebecryl 4396.

TABLE 9

| | Composition | | | | | |
|---|---|---|---|---|---|---|
| | Comparative | Inventive | | | | |
| Test | 1.4 | 2.1 | 2.2 | 2.3 | 2.4 | 2.5 |
| Isocyanate NCO (wt %) | 0 | 0.375 | 0.75 | 1.125 | 1.5 | 2.25 |
| Shore D Hardness | 60 | 53 | 53 | 50 | 47 | 41 |
| Adhesion to membrane Prior to Immersion | SF | SF | SF | SF | SF | SF |
| Adhesion to membrane 1 week in pH 1.5 Solution | SF | SF | SF | SF | SF | SF |
| Adhesion to membrane 1 week in pH 8 Solution | SF | SF | SF | SF | SF | SF |
| Adhesion to membrane 1 week in pH 12.5 Solution | AF | SF | SF | SF | SF | AF |

The adhesion to the membrane for all the formulas showed substrate failure (SF) before immersion in the aqueous solutions. After immersion for one week in the 3 solutions, all composition (except Inventive Composition 2.5) showed good membrane adhesion (SF). Inventive Composition 2.5 showed lost adhesion (AF) after immersion in the pH 12.5 solution.

The polyether urethane-containing formulations (Inventive Compositions 1.1, 1.2, and 1.3) all maintained membrane adhesion (SF) in all 3 solutions. Thus, the addition of the Ebecryl 4396 improved the membrane adhesion after immersion in the pH 12.5 solution as compared to analogous Comparative Compositions 1.1, 1.2, and 1.4, respectively. However, Shore D hardness decreased with the addition of the Ebecryl 4396.

Inventive Composition 1.5 (containing polybutyl acrylate oligomer) had substrate failure (SF) after immersion in both pH 1.5 and pH 8. This is an improvement over the AF membrane adhesion of analogous Comparative Composition 1.6 (without Ebecryl 4396). Inventive Compositions 1.4 (containing polybutandiene dimethacyrlate oligomer) had very similar adhesion failure mode compared to analogous Comparative Composition 1.5 (without Ebecryl 4396).

Inventive Example 3—Curable Compositions with Different Isocyanate-Functionalized Adhesion Promoters Various photocurable formulations with the polyether urethane acrylate BR582 E8 and different isocyanate-functionalized adhesion promoters were formulated as shown below in Table 10. Comparative Composition 1.4 (without an adhesion promoter) was included for purposes of comparison. Ebecryl 4250 and Ebecryl 4396 are isocyanate-functionalized adhesion promoters with acrylate functionality. Ebecryl 4250 has an acrylate functionality of 3.4 and an isocyanate functionality of 1.4 and an average NC content of 5%. Desmodur XP 2599 and Desmodur VPLS 2371 are isocyanate-functionalized adhesion promoters without acrylate functionality. Desmodur XP 2599 has an average NCO % of 5% and Desmodur VPLS 2371 has an average NCO % of 3.7%.

TABLE 10

| | Composition/Amt (wt %) | | | | |
|---|---|---|---|---|---|
| | Comparative | Inventive | | | |
| Ingredient | 1.4 | 3.1 | 3.2 | 3.3 | 3.4 |
| BR582 E8 | 46 | 39.1 | 39.1 | 39.1 | 39.1 |
| Ebecryl 4396 | | 15 | | | |
| Ebecryl 4250 | | | 15 | | |
| Desmodur XP 2599 | | | | 15 | |
| Desmodur VPLS 2371 | | | | | 15 |
| SR 259 | 30 | 25.5 | 25.5 | 25.5 | 25.5 |
| Omnirad 819 | 1 | 0.85 | 0.85 | 0.85 | 0.85 |
| R202 | 3 | 2.55 | 2.55 | 2.55 | 2.55 |
| Ceraflour 970 | 20 | 17 | 17 | 17 | 17 |
| Total | 100 | 100 | 100 | 100 | 100 |

These formulations were cured and tested for shore hardness and adhesion to membrane. The results are shown below in Table 11. Also reported in Table 11 is the isocyanate NCO wt % in each formula calculated based on the amount of isocyanate-functionalized adhesion promoter in each formula and the NCO % of the isocyanate-functionalized adhesion promoter.

TABLE 11

| | Composition | | | | |
|---|---|---|---|---|---|
| | Comparative | Inventive | | | |
| Test | 1.4 | 3.1 | 3.2 | 3.3 | 3.4 |
| Isocyanate NCO (wt %) | 0 | 1.125 | 0.75 | 0.75 | 0.55 |
| Shore D Hardness | 60 | 48 | 63 | 35 | 37 |
| Adhesion to membrane Prior to Immersion | SF | SF | SF | SF | SF |
| Adhesion to membrane 1 week in pH 1.5 Solution | SF | SF | SF | SF | SF |
| Adhesion to membrane 1 week in pH 8 Solution | SF | SF | SF | SF | SF |
| Adhesion to membrane 1 week in pH 12.5 Solution | AF | SF | SF | SF | SF |

The adhesion to the membrane for all the formulas showed substrate failure (SF) before immersion in the aqueous solutions. After immersion for 1 week in all 3 solutions, all compositions (except Comparative Composition 1.4) showed substrate failure (SF) for all solutions. Shore D hardness was below 40 for the compositions including isocyanate-functionalized adhesion promoters without acrylate functionality (i.e., Desmodur XP 2599 and Desmodur VPLS 2371).

Inventive Example 4—Curable Compositions with Only Isocyanate-Functionalized Urethane Acrylate Isocyanate-functionalized urethane acrylate were formulated without the addition of other acrylate oligomers or monomers. Curable compositions with Ebecryl 4396, Ebecryl 4250 and the combinations of these two were shown below in Table 12.

TABLE 12

| | Inventive Composition/Amt (wt %) | | |
|---|---|---|---|
| Ingredient | 4.1 | 4.2 | 4.3 |
| Ebecryl 4396 | 75 | | 37.5 |
| Ebecryl 4250 | | 75 | 37.5 |
| Omnirad TPO-L | 2 | 2 | 2 |
| R202 | 3 | 3 | 3 |
| Ceraflour 970 | 20 | 20 | 20 |
| Total | 100 | 100 | 100 |

These formulations were cured and tested for shore hardness and adhesion to membrane. The results are shown below in Table 13. Also reported in Table 13 is the isocyanate NCO wt % in each formula calculated based on the amount of isocyanate-functionalized adhesion promoter in each formula and the NCO % of the isocyanate-functionalized adhesion promoter.

TABLE 13

| Test | Inventive Composition | | |
|---|---|---|---|
| | 4.1 | 4.2 | 4.3 |
| Isocyanate NCO (wt %) | 5.625 | 3.75 | 4.688 |
| Shore D Hardness | 10 | 70 | 50 |
| Adhesion to membrane Prior to Immersion | SF | SF | SF |
| Adhesion to membrane 1 week in pH 1.5 Solution | SF | SF | SF |
| Adhesion to membrane 1 week in pH 8 Solution | SF | SF | SF |
| Adhesion to membrane 1 week in pH 12.5 Solution | SF | SF | SF |

The adhesion to the membrane for all the formulas showed substrate failure (SF) before immersion in the aqueous solutions. After immersion for 1 week in all 3 solutions, all compositions showed substrate failure (SF) for all solutions.

What is claimed is:

1. A photocurable composition comprising
a) a (meth)acrylate-functionalized urethane component;
b) a (meth)acrylate monomer; and
c) a photoinitiator,
wherein the (meth)acrylate-functionalized urethane component comprises isocyanate functionality and/or the photocurable composition further comprises:
d) an isocyanate-functionalized adhesion promoter, and
wherein when deposited on a polyamide surface of a substrate and exposed to UV or visible light the curable composition forms a cured reaction product on the polyamide surface of the substrate and the cured reaction product demonstrates an adhesion to the polyamide surface of the substrate characterized by:
1) substrate failure after immersion in acidic, aqueous (pH=1.5) conditions for about 1 week at a temperature of about 50° C.; and/or
2) Substrate failure after immersion in basic, aqueous (pH=12.5) conditions for about 1 week at a temperature of about 50° C.; and/or
3) Substrate failure after immersion in neutral, aqueous (pH=7.0) conditions for about 1 week at a temperature of about 50° C.,
wherein the substrate is a reverse osmosis membrane with a polyamide surface,
wherein the isocyanate-functionalized adhesion promoter is present in an amount of about 5% to about 60% by weight based on the total weight of the curable composition, wherein the cured reaction product also demonstrates an adhesion to the polyamide surface of the substrate characterized by substrate failure prior to immersion in aqueous conditions.

2. A photocurable composition comprising
a) a (meth)acrylate-functionalized urethane component;
b) a (meth)acrylate monomer; and
c) a photoinitiator,
wherein the (meth)acrylate-functionalized urethane component comprises isocyanate functionality and/or the photocurable composition further comprises:
d) an isocyanate-functionalized adhesion promoter, and
wherein when deposited on a polyamide surface of a substrate and exposed to UV or visible light the curable composition forms a cured reaction product on the polyamide surface of the substrate and the cured reaction product demonstrates an adhesion to the polyamide surface of the substrate characterized by:
1) substrate failure after immersion in acidic, aqueous (pH=1.5) conditions for about 1 week at a temperature of about 50° C.; and/or
2) Substrate failure after immersion in basic, aqueous (pH=12.5) conditions for about 1 week at a temperature of about 50° C.; and/or
3) Substrate failure after immersion in neutral, aqueous (pH=7.0) conditions for about 1 week at a temperature of about 50° C.,
wherein the substrate is a reverse osmosis membrane with a polyamide surface,
wherein the isocyanate-functionalized adhesion promoter is present in an amount of about 5% to about 60% by weight based on the total weight of the curable composition, wherein the curable composition has a viscosity of about 10,000 to about 100,000 cps.

3. A photocurable composition of claim 2, wherein the cured reaction product has a Shore D hardness of about 30 or greater.

4. A photocurable composition comprising
a) a (meth)acrylate-functionalized urethane component;
b) a (meth)acrylate monomer; and
c) a photoinitiator,
wherein the (meth)acrylate-functionalized urethane component comprises isocyanate functionality and/or the photocurable composition further comprises:
d) an isocyanate-functionalized adhesion promoter, and
wherein when deposited on a polyamide surface of a substrate and exposed to UV or visible light the curable composition forms a cured reaction product on the polyamide surface of the substrate and the cured reaction product demonstrates an adhesion to the polyamide surface of the substrate characterized by:
1) substrate failure after immersion in acidic, aqueous (pH=1.5) conditions for about 1 week at a temperature of about 50° C.; and/or
2) Substrate failure after immersion in basic, aqueous (pH=12.5) conditions for about 1 week at a temperature of about 50° C.; and/or
3) Substrate failure after immersion in neutral, aqueous (pH=7.0) conditions for about 1 week at a temperature of about 50° C.,
wherein the substrate is a reverse osmosis membrane with a polyamide surface,
wherein the isocyanate-functionalized adhesion promoter is present in an amount of about 5% to about 60% by weight based on the total weight of the curable composition, wherein the curable composition has a thixotropic index of about 1.5 to about 10.

5. The photocurable composition of claim 2, wherein the (meth)acrylate-functionalized urethane component is present in an amount of about 20% to about 60% by weight based on the total weight of the curable composition.

6. The photocurable composition of claim 2, wherein the (meth)acrylate-functionalized urethane component is a polyether urethane acrylate oligomer or a polyester urethane acrylate.

7. The photocurable composition of claim 2, wherein the (meth)acrylate monomer is present in an amount of about 20% to about 40% by weight based on the total weight of the curable composition.

8. The photocurable composition of claim 2, wherein the (meth)acrylate monomer is a polyethylene glycol diacrylate.

9. The photocurable composition of claim 2, wherein the (meth)acrylate monomer has a viscosity of less than about 1,000 cps.

10. A photocurable composition comprising
a) a (meth)acrylate-functionalized urethane component;
b) a (meth)acrylate monomer; and
c) a photoinitiator,
wherein the (meth)acrylate-functionalized urethane component comprises isocyanate functionality and/or the photocurable composition further comprises:
d) an isocyanate-functionalized adhesion promoter, and
wherein when deposited on a polyamide surface of a substrate and exposed to UV or visible light the curable composition forms a cured reaction product on the polyamide surface of the substrate and the cured reaction product demonstrates an adhesion to the polyamide surface of the substrate characterized by:
1) substrate failure after immersion in acidic, aqueous (pH=1.5) conditions for about 1 week at a temperature of about 50° C.; and/or
2) Substrate failure after immersion in basic, aqueous (pH=12.5) conditions for about 1 week at a temperature of about 50° C.; and/or
3) Substrate failure after immersion in neutral, aqueous (pH=7.0) conditions for about 1 week at a temperature of about 50° C.,
wherein the substrate is a reverse osmosis membrane with a polyamide surface,
wherein the isocyanate-functionalized adhesion promoter also comprises (meth)acrylate functionality.

11. A photocurable composition comprising
a) a (meth)acrylate-functionalized urethane component;
b) a (meth)acrylate monomer; and
c) a photoinitiator,
wherein the (meth)acrylate-functionalized urethane component comprises isocyanate functionality and/or the photocurable composition further comprises:
d) an isocyanate-functionalized adhesion promoter, and
wherein when deposited on a polyamide surface of a substrate and exposed to UV or visible light the curable composition forms a cured reaction product on the polyamide surface of the substrate and the cured reaction product demonstrates an adhesion to the polyamide surface of the substrate characterized by:
1) substrate failure after immersion in acidic, aqueous (pH=1.5) conditions for about 1 week at a temperature of about 50° C.; and/or
2) Substrate failure after immersion in basic, aqueous (pH=12.5) conditions for about 1 week at a temperature of about 50° C.; and/or
3) Substrate failure after immersion in neutral, aqueous (pH=7.0) conditions for about 1 week at a temperature of about 50° C.,
wherein the substrate is a reverse osmosis membrane with a polyamide surface,
wherein the isocyanate-functionalized adhesion promoter is selected from the group consisting of isocyanate-terminated urethane acrylates, isocyanate-terminated aliphatic prepolymers, and combinations thereof and wherein the isocyanate-functionalized adhesion promoter is present in an amount of about 5% to about 60% by weight based on the total weight of the curable composition.

12. The photocurable composition of claim 2, wherein the photoinitiator is present in an amount of about 0.2% to about 5% by weight based on the total weight of the curable composition.

13. A photocurable composition comprising
a) a (meth)acrylate-functionalized urethane component;
b) a (meth)acrylate monomer; and
c) a photoinitiator,
wherein the (meth)acrylate-functionalized urethane Component comprises isocyanate functionality and/or the photocurable composition further comprises:
d) an isocyanate-functionalized adhesion promoter, and
wherein when deposited on a polyamide surface of a substrate and exposed to UV or visible light the curable composition forms a cured reaction product on the polyamide surface of the substrate and the cured reaction product demonstrates an adhesion to the polyamide surface of the substrate characterized by:
1) substrate failure after immersion in acidic, aqueous (pH=1.5) conditions for about 1 week at a temperature of about 50° C.; and/or
2) Substrate failure after immersion in basic, aqueous (pH=12.5) conditions for about 1 week at a temperature of about 50° C.; and/or
3) Substrate failure after immersion in neutral, aqueous (pH=7.0) conditions for about 1 week at a temperature of about 50° C.,
wherein the substrate is a reverse osmosis membrane with a polyamide surface,
wherein the isocyanate-functionalized adhesion promoter is present in an amount of about 58 to about 60% by weight based on the total weight of the curable composition, wherein the photoinitiator is a polymeric structure to which is attached at least one chromophore that is excited by radiation in the UV light or visible light range.

14. A composite membrane structure comprising:
a) a membrane comprising at least one surface; and
b) the cured reaction product of the photocurable composition of claim 2 disposed on at least a portion of the at least one surface of the membrane.

15. The composite membrane structure of claim 14, wherein the cured reaction product is adhesively bonded to at least a portion of the at least one surface of the membrane.

16. The composite membrane structure of claim 14, wherein the cured reaction product is disposed on at least a portion of the at least one surface of the membrane in a pre-determined pattern.

17. The composite membrane structure of claim 16, wherein the pre-determined pattern is selected from the group consisting of stripes, waves, circles, ovals, arcs, squares, rectangles, diamonds, pentagons, hexagons, stars, chevrons, a random pattern, and combinations thereof.

18. The composite membrane structure of claim 14, wherein at least one surface of the membrane is constructed from polyamide and/or comprises reactive hydroxyl-functionalized moieties.

19. A method of a producing a cured reaction product comprising the steps of:
a) providing a curable composition comprising:
i) a (meth)acrylate-functionalized urethane component;
ii) a (meth)acrylate monomer; and
iii) a photoinitiator;
wherein the (meth)acrylate-functionalized urethane component comprises isocyanate functionality and/ or the photocurable composition further comprises:
iv) an isocyanate-functionalized adhesion promoter, and
b) exposing the curable composition to a source of UV or visible light to form a cured reaction product, wherein when deposited on a polyamide surface of a substrate and exposed to UV or visible light the curable composition forms a cured reaction product on the polyamide surface of the substrate and the cured reaction product demonstrates an adhesion to the polyamide surface of the substrate characterized by:

1) substrate failure after immersion in acidic, aqueous (pH=1.5) conditions for about 1 week at a temperature of about 50° C.; and/or
2) Substrate failure after immersion in basic, aqueous (pH=12.5) conditions for about 1 week at a temperature of about 50° C.; and/or
3) Substrate failure after immersion in neutral, aqueous (pH=7.0) conditions for about 1 week at a temperature of about 50° C., wherein the substrate is a reverse osmosis membrane with a polyamide surface and wherein the cured reaction product also demonstrates adhesion to the polyamide surface of the substrate characterized by substrate failure prior to immersion in aqueous conditions.

20. The method of claim 19, wherein the cured reaction product has a Shore D hardness of about 30 or greater.

21. The method of claim 19, wherein the (meth)acrylate-functionalized urethane component is present in an amount of about 20% to about 60% by weight based on the total weight of the curable composition.

22. The method of claim 19, wherein the (meth)acrylate-functionalized urethane component is a polyether urethane acrylate oligomer or a polyester urethane acrylate oligomer.

23. The method of claim 19, wherein the (meth)acrylate monomer is present in an amount of about 10% to about 50% by weight based on the total weight of the curable Composition.

24. A photocurable composition comprising
a) a (meth)acrylate-functionalized urethane component present in an amount of about 20% by weight to about 60% by weight based on the total weight of the curable composition;
b) a (meth)acrylate monomer present in an amount of about 20% by weight to about 40% by weight based on the total weight of the curable composition; and
c) a photoinitiator present in an amount of about 0.2% by weight to about 5% by weight based on the total weight of the curable composition;

wherein the (meth)acrylate-functionalized urethane component comprises isocyanate functionality and/or the photocurable composition further comprises:
d) an isocyanate-functionalized adhesion promoter present in an amount of about 5% by weight to about 60% by weight based on the total weight of the curable composition, and wherein when deposited on a polyamide surface of a substrate and exposed to UV or visible light the curable composition forms a cured reaction product on the polyamide surface of the substrate and the cured reaction product demonstrates an adhesion to the polyamide surface of the substrate characterized by:

1) substrate failure after immersion in acidic, aqueous (pH=1.5) conditions for about 1 week at a temperature of about 50° C.; and/or
2) Substrate failure after immersion in basic, aqueous (pH=12.5) conditions for about 1 week at a temperature of about 50° C.; and/or
3) Substrate failure after immersion in neutral, aqueous (pH=7.0) conditions for about 1 week at a temperature of about 50° C., wherein the substrate is a reverse osmosis membrane with a polyamide surface.

* * * * *